р

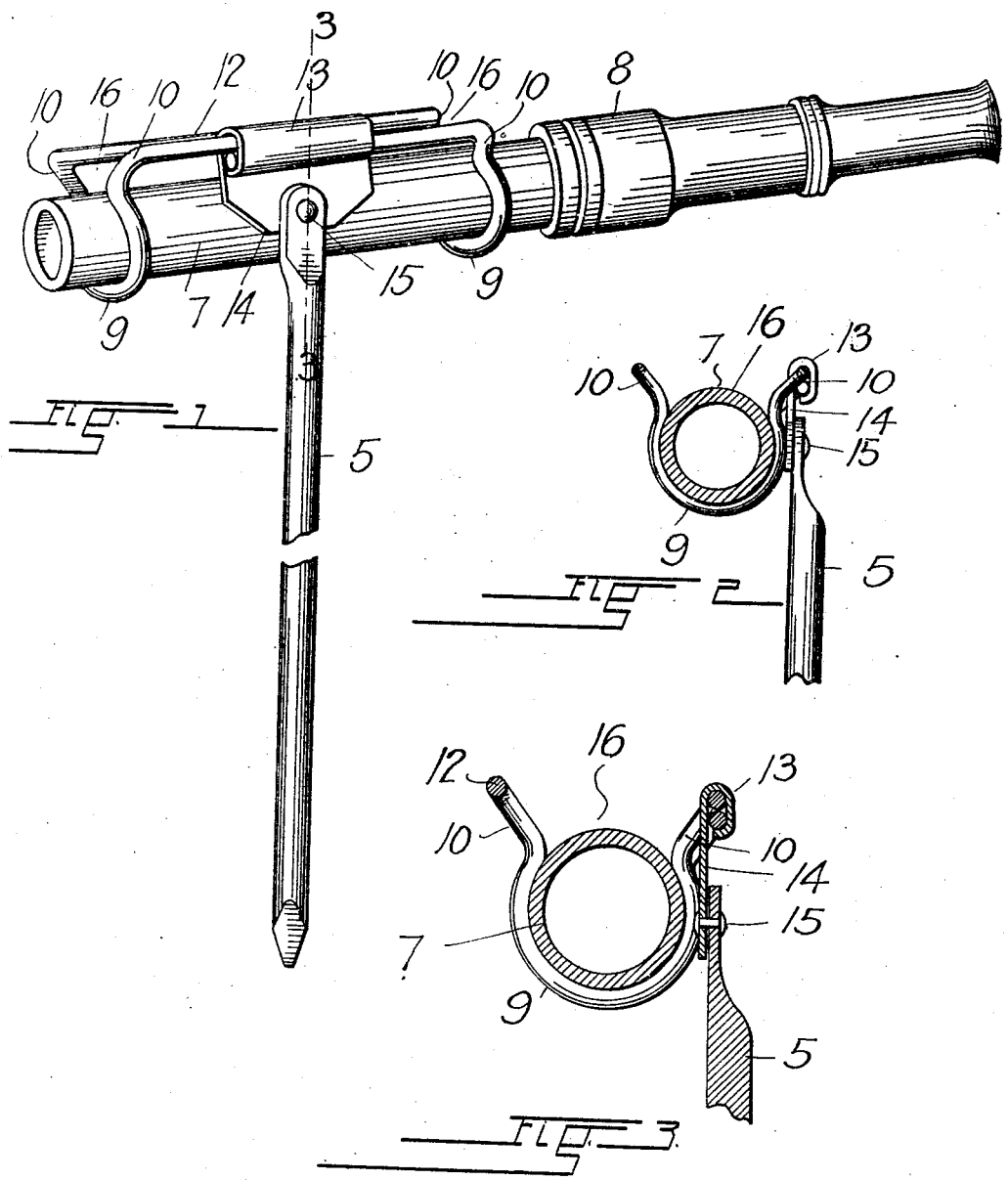

UNITED STATES PATENT OFFICE.

JOHN JAEGER, OF DENVER, COLORADO.

HOLDER FOR GARDEN-HOSE.

961,297. Specification of Letters Patent. Patented June 14, 1910.

Application filed November 30, 1909. Serial No. 530,641.

*To all whom it may concern:*

Be it known that I, JOHN JAEGER, a citizen of the United States of America, residing at Denver, in the county of Denver and State of Colorado, have invented certain new and useful Improvements in Holders for Garden-Hose, of which the following is a specification.

This invention relates to holders for garden hose and its object is to provide a device of the class named which combines simplicity of construction with great practicability in use and which is capable of maintaining a hose and the nozzle connected therewith at any selected angle of inclination without the use of nuts or other fastening means. I attain this object by the means illustrated in the accompanying drawings in the various views of which like parts are similarly designated and in which—

Figure 1, represents a perspective view of the improved holder with a garden hose and its nozzle in an operative position, Fig. 2, an end-view of the holder, the lower portion of the supporting pin having been omitted and Fig. 3, a section taken along the line 3—3 Fig. 1.

The holder as shown in the drawings, is composed of a pointed pin or peg 5, which when driven into the ground, serves as a support for a cradle 6 which is pivotally mounted at its upper extremity and which is adapted to secure a garden hose 7 and a therewith connected nozzle 8 against displacement while water is forced therethrough.

The cradle 6 is composed of a single piece of wire which is bent to form two substantially parallel, arcual clips 9 whose outwardly flaring extremities 10 determine a mouth 16 through which the hose is introduced when placed in the holder.

The extremities 10 of the two members 9 at one side of the cradle, are integral with a rectilinear side rail 12 while those at the opposite side, are part of the terminal portions of the wire which extend oppositely in parallel relation to the rail 12 and whose overlapping extremities are firmly secured in a fold 13 of a connecting plate 14.

The upper extremity of the peg 5 is connected with the plate 14 by means of a rivet 15 which is clenched so as to produce a frictional contact between the two elements, sufficient to maintain the one in its adjusted position relative to the other without the use of a nut or other fastening appliance.

The angle of the circular arcs of the two similar holding-members 9, exceeds 180 degress so that the garden hose 17 introduced thereinto through their mouths 16 will when positioned as is shown in the drawings, be absolutely held against displacement, the wire of which the cradle is composed being sufficiently resilient to permit distention of the mouths of the clips when the hose is forced downwardly between their connected outwardly divergent portions 10.

Having thus described my invention what I claim and desire to secure by Letters Patent is:—

1. In a holder for garden hose, a cradle composed of a single piece of wire bent to provide two arcuate holding members whose extremities diverge outwardly to define a mouth through which a hose may be introduced, the corresponding extremities of the said members at opposite sides being connected by side-rails one of which is composed of the overlapping terminal portions of the said wire, a member firmly securing the said terminal portions and a supporting element pivotally connected with the said member.

2. In a holder for garden hose, a cradle composed of a single piece of wire bent to provide two arcuate holding members whose extremities diverge outwardly to define a mouth through which a hose may be introduced, the corresponding extremities of the said members at opposite sides being connected by side-rails one of which is composed of the overlapping terminal portions of the said wire, a plate having a fold in which the said terminal portions are firmly secured, and a supporting element pivotally connected with the said plate.

3. In a holder for garden hose, a cradle composed of a single piece of wire bent to provide two holding members whose extremities diverge outwardly to define a mouth through which a hose may be introduced, the corresponding extremities of the said members at opposite sides, being connected by side-rails one of which is composed of the overlapping terminal portions of the said wire, a member firmly securing the said terminal portions and a supporting element pivotally connected with the said member.

4. A holder for garden hose comprising in combination with a supporting element, a cradle composed of a single piece of wire bent to provide two arcuate holding members whose extremities diverge outwardly to define a mouth through which a hose may be introduced, the corresponding extremities of the said members at opposite sides being connected by side-rails one of which is composed of the terminal portions of the said wire, and a member firmly securing the said terminal portions.

5. A holder for garden hose comprising in combination with a supporting element, a cradle composed of a single piece of wire bent to provide two arcuate holding members adapted to receive a hose, the corresponding extremities of said members at opposite sides being connected by side rails, one of which is composed of the terminal portions of the said wire, and a member firmly securing the said terminal portions.

In testimony whereof I have affixed my signature in presence of two witnesses.

JOHN JAEGER.

Witnesses:
G. J. ROLLANDET,
M. L. GEARY.